US008261980B1

(12) United States Patent
Scutellaro et al.

(10) Patent No.: US 8,261,980 B1
(45) **Date of Patent: *Sep. 11, 2012**

(54) AUTOMATED FOOD SERVICE AND BILLING SYSTEM AND METHOD

(75) Inventors: Joseph E. Scutellaro, Brick, NJ (US); Steven R. Baker, Windermere, FL (US); Robert A. Baydale, Windermere, FL (US); Norman L. Norris, Birchrunville, PA (US); Louis J. Pecci, Jacksonville, FL (US)

(73) Assignee: GFC Automat, Inc., Toms River, NJ (US)

(*) Notice: Subject to any disclaimer, the term of this patent is extended or adjusted under 35 U.S.C. 154(b) by 49 days.

This patent is subject to a terminal disclaimer.

(21) Appl. No.: 12/497,121

(22) Filed: Jul. 2, 2009

Related U.S. Application Data

(63) Continuation of application No. 11/364,690, filed on Feb. 27, 2006, now Pat. No. 7,568,618.

(60) Provisional application No. 60/657,493, filed on Mar. 1, 2005.

(51) Int. Cl.
*G06K 15/00* (2006.01)

(52) U.S. Cl. .......... 235/383

(58) Field of Classification Search .......... 235/381, 235/383, 385; 221/1, 2; 186/36–39
See application file for complete search history.

(56) References Cited

U.S. PATENT DOCUMENTS

| | | | | |
|---|---|---|---|---|
| 5,499,707 | A | 3/1996 | Steury | |
| 5,586,686 | A * | 12/1996 | Bustos et al. | 221/211 |
| 5,845,263 | A * | 12/1998 | Camaisa et al. | 705/15 |
| 6,102,162 | A | 8/2000 | Teicher | |
| 6,281,477 | B1 * | 8/2001 | Forrester et al. | 219/387 |
| 7,093,755 | B2 | 8/2006 | Jordan et al. | |
| 7,114,650 | B2 | 10/2006 | Sherrod | |
| 2002/0133418 | A1 * | 9/2002 | Hammond et al. | 705/26 |
| 2003/0088469 | A1 * | 5/2003 | Leifer | 705/15 |
| 2004/0015403 | A1 * | 1/2004 | Moskowitz et al. | 705/26 |
| 2005/0059414 | A1 * | 3/2005 | Mahmoodi et al. | 455/456.2 |

OTHER PUBLICATIONS

Diehl, L.B. and Hardart, M., The Automat: The History, Recipes, and Allure of Horn & Hardart's Masterpiece, Nov. 2002, Clarkson Potter/Publishers, New York, entire book. Also on the web: http:www.theautomat.net, 128 pages.

* cited by examiner

*Primary Examiner* — Seung Lee
(74) *Attorney, Agent, or Firm* — Woodcock Washburn LLP

(57) ABSTRACT

An automated restaurant including a plurality of food delivery locations and a food preparation area. A computer system is in electronic communication with the food delivery locations and the food preparation area. Visual content stored in the computer system is displayed on display screens at each of the food delivery locations. The visual content may include information relating to a customer food order which is stored in the computer system for later delivery to a corresponding food delivery location as well as entertainment. The customer may directly enter a food order and pay for the order at the food delivery location.

17 Claims, 5 Drawing Sheets

AUTOMATED FOOD SERVICE AND BILLING SYSTEM AND METHOD

CROSS-REFERENCE TO RELATED APPLICATIONS

This application is a continuation of application Ser. No. 11/364,690 filed Feb. 27, 2006 and claims the benefit of priority of U.S. Provisional Patent Application No. 60/657,493, filed Mar. 1, 2005 which is incorporated herein by reference.

FIELD OF INVENTION

This invention relates generally to systems and methods for serving food to customers, and, more particularly, to systems and methods for ordering, preparing and delivering food to customers in a restaurant setting.

BACKGROUND OF THE INVENTION

Restaurants are increasingly faced with the challenge of serving the very best foods in a very short time frame to meet the needs of the consuming public. In addition, there is often the need to serve large numbers of people in high traffic areas in a cost effective manner.

In the early part of the last century, a concept was introduced to the restaurant industry called "The Automat". These restaurants which appeared in the New York City and Philadelphia area were capable of serving food, which by the standards of the day, was considered very good. Perhaps more importantly, these restaurants were capable of serving food in relatively short time frames to large numbers of people in busy metropolitan areas. To achieve these objectives, "The Automat" restaurants of that era employed small enclosures with glass doors where food from the kitchen was delivered to the customers. The doors would only open when a customer inserted a coin in a slot thereby allowing the food to be retrieved from the enclosure.

While "The Automat" restaurant of its day was considered state of the art, aspects of the food delivery system would be considered antiquated by today's standards. First, current health laws do not permit heated food to stand for any length of time before serving. It would therefore be impossible to deliver hot food to an enclosure for an indeterminate period of time before a patron inserts his or her nickel to retrieve the food from the enclosure. Second, the use of coins would be cumbersome given the cost of food as compared with the low value of coinage today. Third, while the old "Automat" restaurants did serve food expeditiously for the time, today's world operates at a much faster pace, especially in high traffic areas.

Yet, the basic concept of delivering high quality food to restaurant patrons from small enclosures in high traffic areas remains appealing today if health law issues, payment/currency issues and speed of delivery issues could somehow be addressed.

SUMMARY OF THE INVENTION

In accordance with one embodiment of the invention, a method for operating restaurant comprising a plurality of food delivery locations and a food preparation area includes the step of receiving a food order entered by a customer and transmitting a an electronic signal to a computer system representing the food order. The computer system electronically stores the food order and a corresponding food delivery location for the food order. A display screen at each food delivery location displays visual content stored in the computer system to the customer. Food corresponding to the food order in the food preparation area and the food is then delivered to the corresponding delivery location. A customers may pay the bill at the corresponding food delivery location by, for example using, a credit card reading device.

In accordance with one aspect of the invention, the visual content displayed on the screen may comprise information related to the customer order of food. In addition or in the alternative, the visual content may comprise entertainment for the customer.

In accordance with another aspect of the invention, the customer may enter an order using a touch screen. The touch screen may be located in area separate from the food delivery locations and therefore different from the display screens at the food delivery locations.

In accordance with another aspect of the invention, the food delivery locations may comprise food enclosures.

BRIEF DESCRIPTION OF THE DRAWINGS

The foregoing summary as well as the following detailed description of preferred embodiments of the invention will be better understood when read in conjunction with the appended drawings.

DETAILED DESCRIPTION OF PREFERRED EMBODIMENTS

Figure 1:
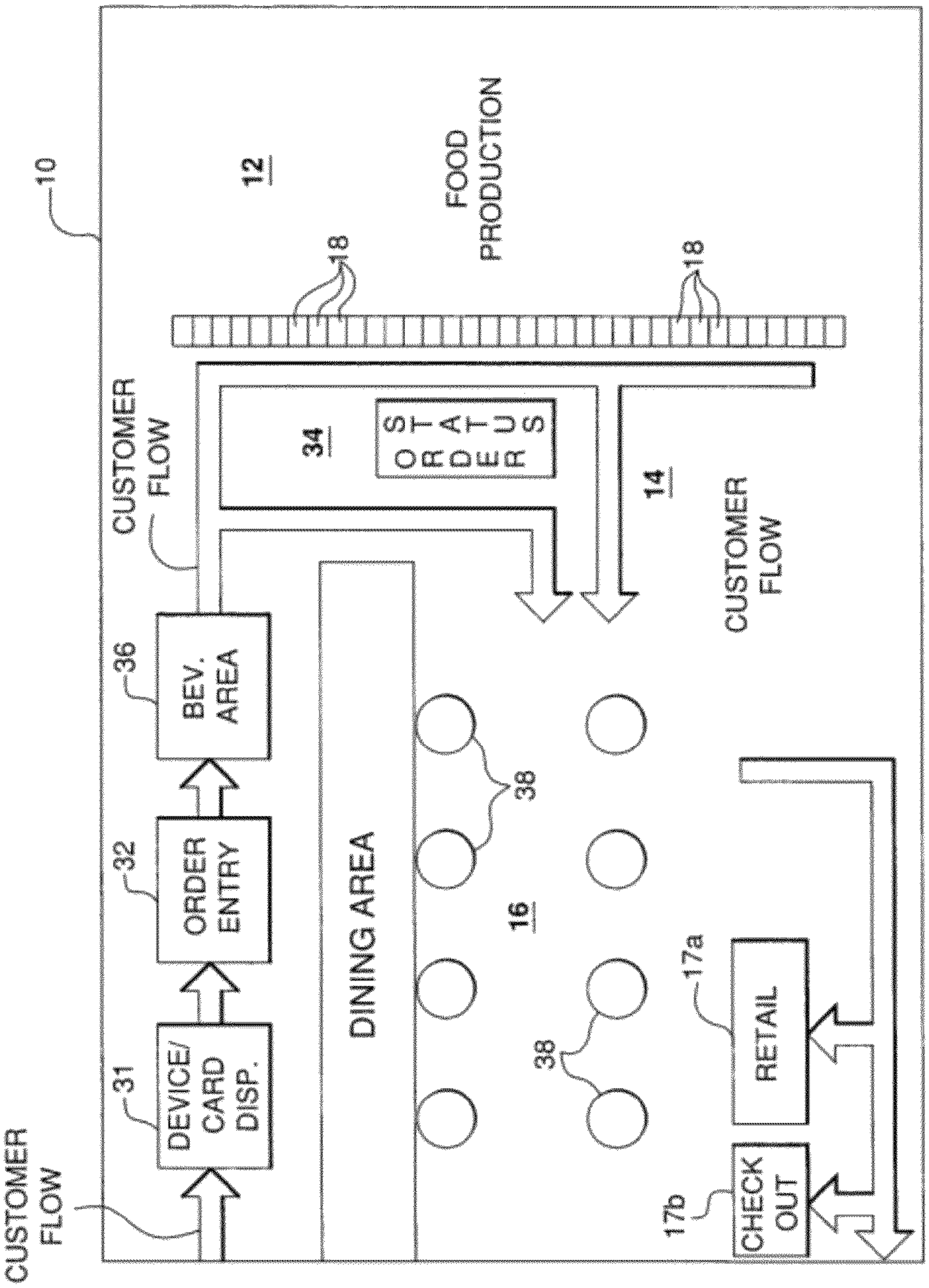
FIG. 1 is a plan view of a restaurant including a schematic representation of customer flow through various areas in the restaurant.

As shown in FIG. 1, a restaurant 10 includes a kitchen or food production area 12, a customer food acquisition area 14, a customer dining area 16, a customer retail area 17*a* and a customer checkout area 17*b*. In accordance with one aspect of invention, the food acquisition area includes an array of food enclosures 18 for receiving food from the kitchen 12 which is inserted into the enclosures 18 through food supply openings and delivering food to the customers in the food acquisition area through customer access openings in the enclosures 18 as will now be described in greater detail with reference to FIGS. 4 and 5.

Figure 4:
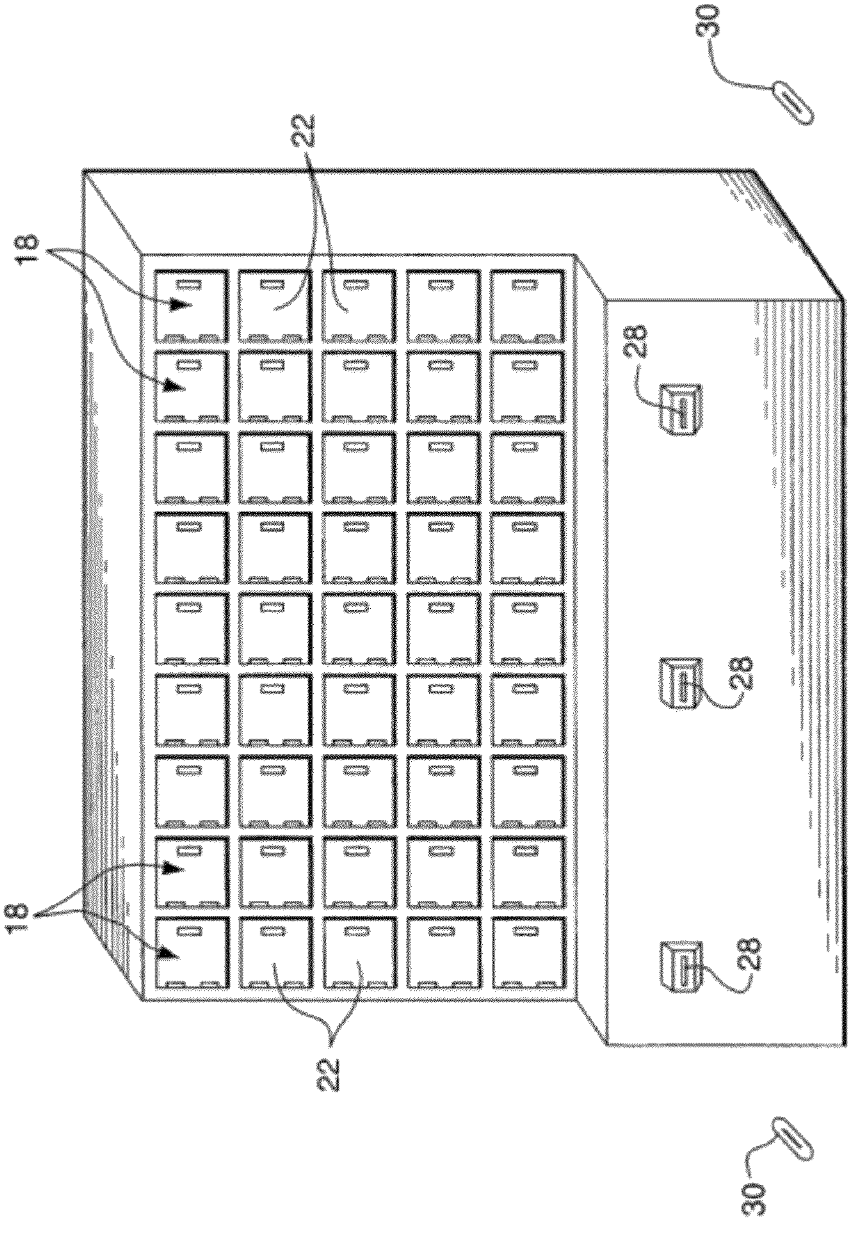
FIG. 4 is a three dimensional view of an array of food enclosures in which food is delivered to customers in accordance with an embodiment of the invention.
Figure 5:
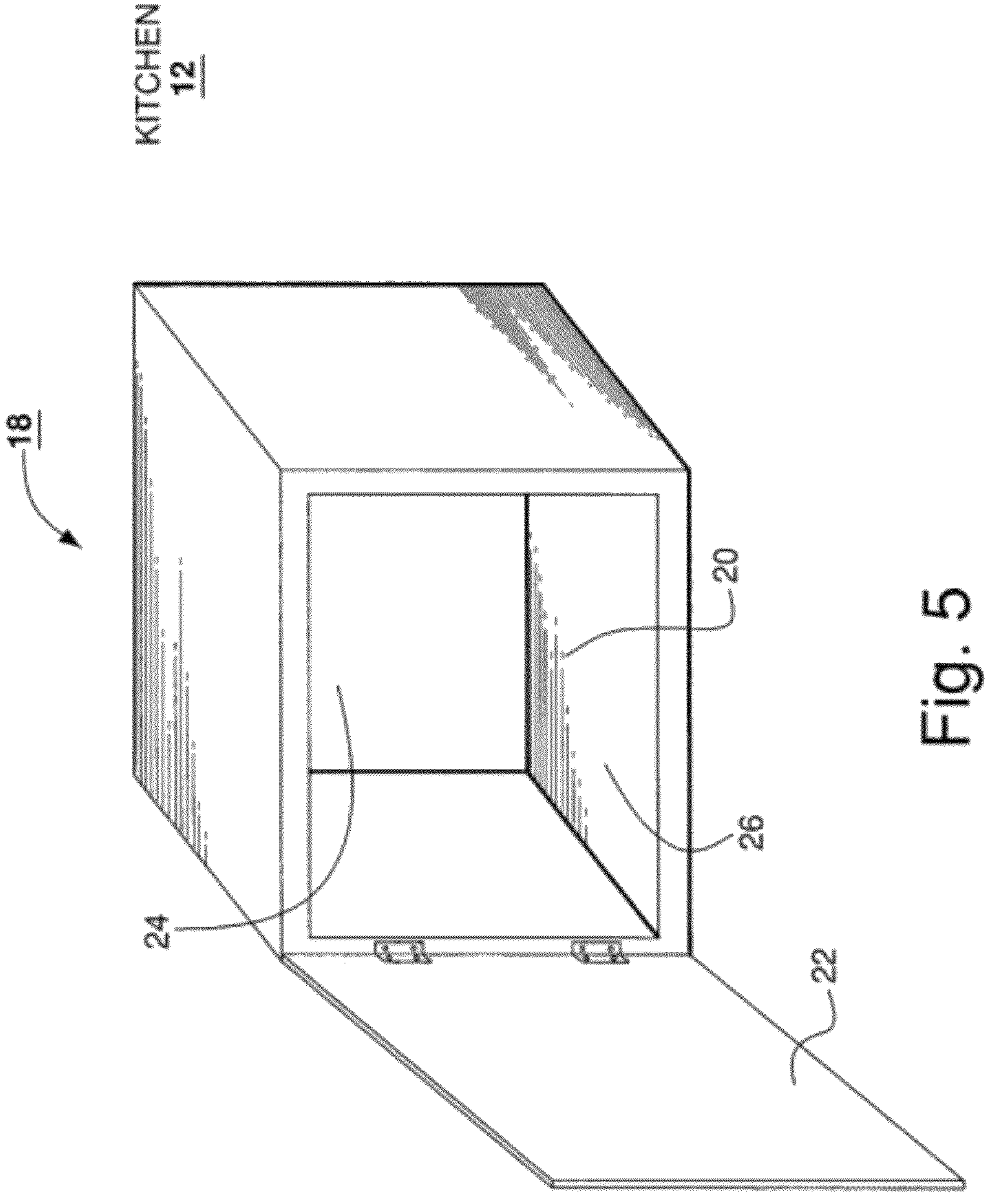
FIG. 5 is an enlarged three dimensional view of one of the enclosures of FIG. 4.

As shown in FIGS. 4 and 5, the array of enclosures 18 is arranged in rows and columns. Each enclosure 18 includes a food access opening 20 which is normally closed by a hinged closure 22 but shown in the open position in FIG. 5 so as to permit removal of the food by the customer. Prior to such removal and before of opening of the closure 22, the food is supplied from the kitchen 12 to the enclosure through a food supply opening 24 and placed on a shelf 26 at the base of the enclosure 18. In accordance with one aspect of the invention, the array of enclosures 18 includes an area shown as a card swipe slot 28 for receiving and communicating with a customer authorization device shown as a card 30 and activating a closure enabling system so as to allow the customer to open the closure 22 of the enclosure 18.

Figure 3:
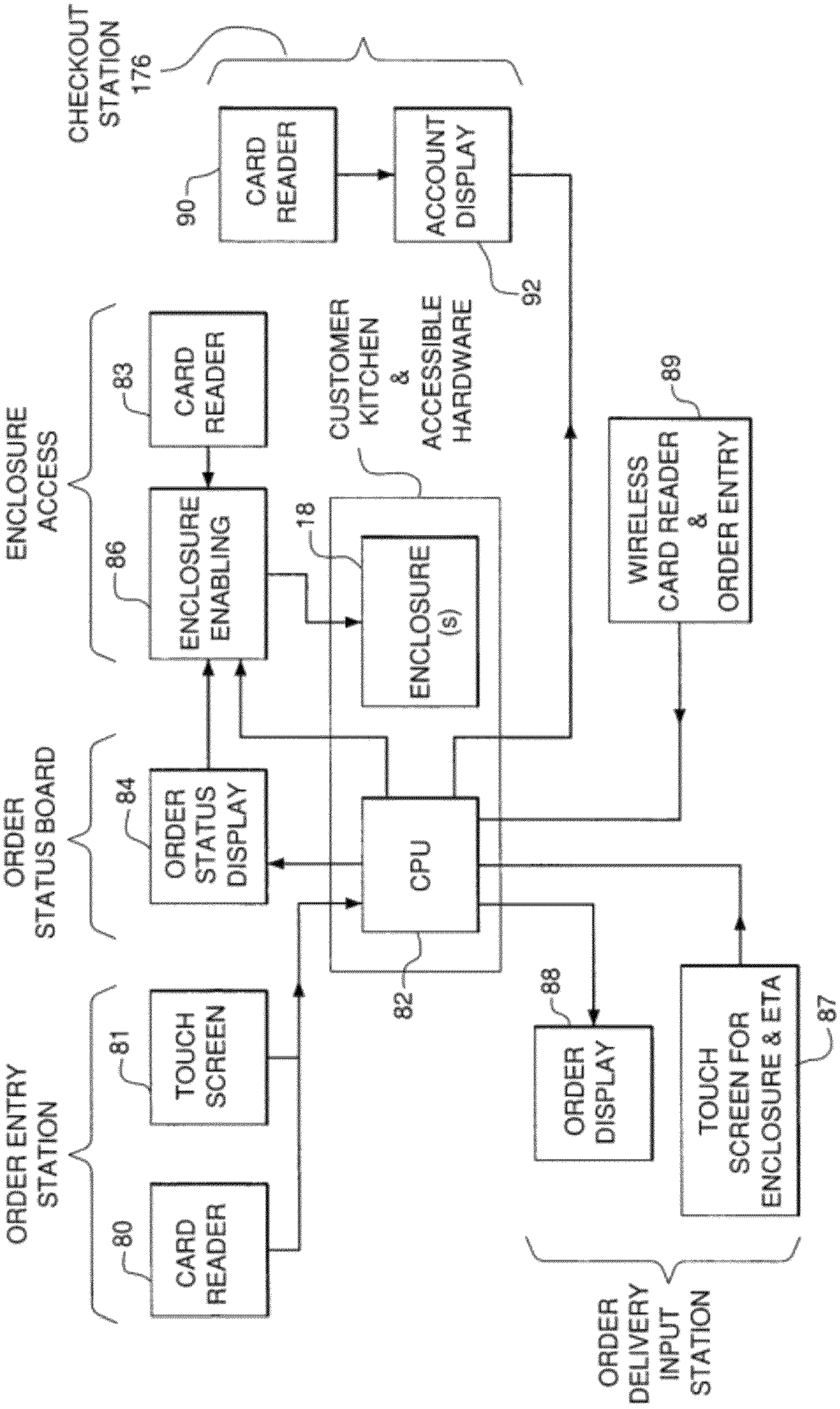
FIG. 3 block diagram of information technology system in the restaurant.

In accordance with one aspect of the invention, the closure 22 may compromise an LCD display which is viewable by the customer when the closure 22 is in the closed position. The display may be used for a variety of purposes including entertainment, images of the food in preparation, other information which may be of interest to the customer as well as advertising. The content of the visual display may be stored at a CPU as shown in FIG. 3 in the form of, for example, a CD.

With reference again to FIG. 1, the food acquisition area includes a station 31 for dispensing the customer authorization device or card 30 to the customer. As used in this embodiment of the invention, the card 30 is a restaurant credit card which is used by the customer during his or her visit to the restaurant. The customer first uses the card 30 at an order area or order entry board 32 which comprises an order entry system such as a touch screen. After the card 30 is read at the order board 32, the customer may enter his or her order using the touch screen and the card 30 is charged for the value of the food ordered. The customer then advances to a status area where the status of the customer order is displayed on a suitable display device such as a status board 34 comprising one or more LCD displays. The status board communicates with the order board through a CPU so as to enable the status board to display each order by identifying the customer using the identification on the card 30 (e.g. a number), a description of items ordered by the customer, identification of specific food enclosures which will receive the items ordered by the customer, and an estimated time of arrival of the items ordered at the food enclosures 18. Since the customer is kept advised of the status of his or her order by the status board 34, the customer is free to access his or her order at the array 16 as the items ordered are delivered to the appropriate enclosures 18.

While the customer awaits the delivery of any item to an enclosure 18, the customer is free to proceed to a beverage dispensing area 36. The beverage area 36 may be automated to the extent that the customer inserts his or her card in to a slot so that the card 30 can be charged for the value of the beverage automatically dispensed. The customer is also free to advance to the dining area 16 to locate a table 38 at which to dine. The customer can then return to the array of food enclosures 18 at the appropriate time to retrieve his or her order knowing that the item ordered is secure since the designated food enclosure cannot be opened without the customer's card 30. Although this embodiment has been described in terms of automatically billing the customer's credit card at the time of ordering at the order board 18, it is also possible that such automatic billing can occur at the time of accessing the food in an enclosure 18.

If a customer requires an additional food item during the course of the meal which has not previously been ordered at the order board 32, this can be accomplished by summoning a member of the wait staff who carries a wireless device for placing the customer's new order. The wireless device includes a card swipe slot for receiving the customer's card 30 so that the card can be appropriately charged. The food may be delivered by the wait staff or the customer may be advised by the wait staff of the particular enclosure 18 where the order will be delivered and the customer can then retrieve the order from that enclosure 18.

After the customer is through dining and all food ordered has been charged to his card or her card 30, the customer proceeds to the retail section 17*a* and the check out station 17*b*. Note that the retail section could include take out food but this is preferably made available in another area not shown so as eliminate take out traffic through the restaurant proper. The customer's card 30 is read at the check out station and the charges to the customer's card are displayed to the customer on a screen or by other suitable means. The customer then pays the displayed amount with cash, a third party credit card, a third party debit card or any other acceptable vehicle for payment which is acceptable to the restaurant.

The embodiment described above in connection with FIG. 1 employs a restaurant credit card. In another embodiment of the invention, the restaurant depicted in FIG. 1 could use third party credit and/or debit cards rather than restaurant credit cards which would eliminate the need for the card dispenser 31. In yet another embodiment of the invention, both restaurant credit cards and third party credit and/or debit cards could be used so as to provide the ability to pay by credit card or cash at the time of check out, in which case the card dispenser 31 will be required. In still another embodiment of the invention, the dispenser 31 can dispense debit cards which are purchased by the customer. The debit cards can be purchased in any amount and can be used by the customer in return visits to the restaurant and the check out station could be eliminated unless the restaurant also permitted the use of third party credit and/or debit cards for ordering and accessing the food in the enclosures 18.

In yet another embodiment of the invention, a bank of enclosures 18 may be provided which is constantly stocked with relatively nonperishable items which do not need to be made to order. For example, food items such as sandwiches and pastries can be stored for extended periods of time in room temperature enclosures 18 or enclosures 18 which are refrigerated. Such enclosures 18 may be constantly stocked so as to permit customers to bypass the order board 32 and the status board 34 and access the food in the enclosure by simply using the appropriate authorization device, e.g., a restaurant credit card or debit card dispensed from the card dispenser 31 or a third party credit card or debit card.

Figure 2:
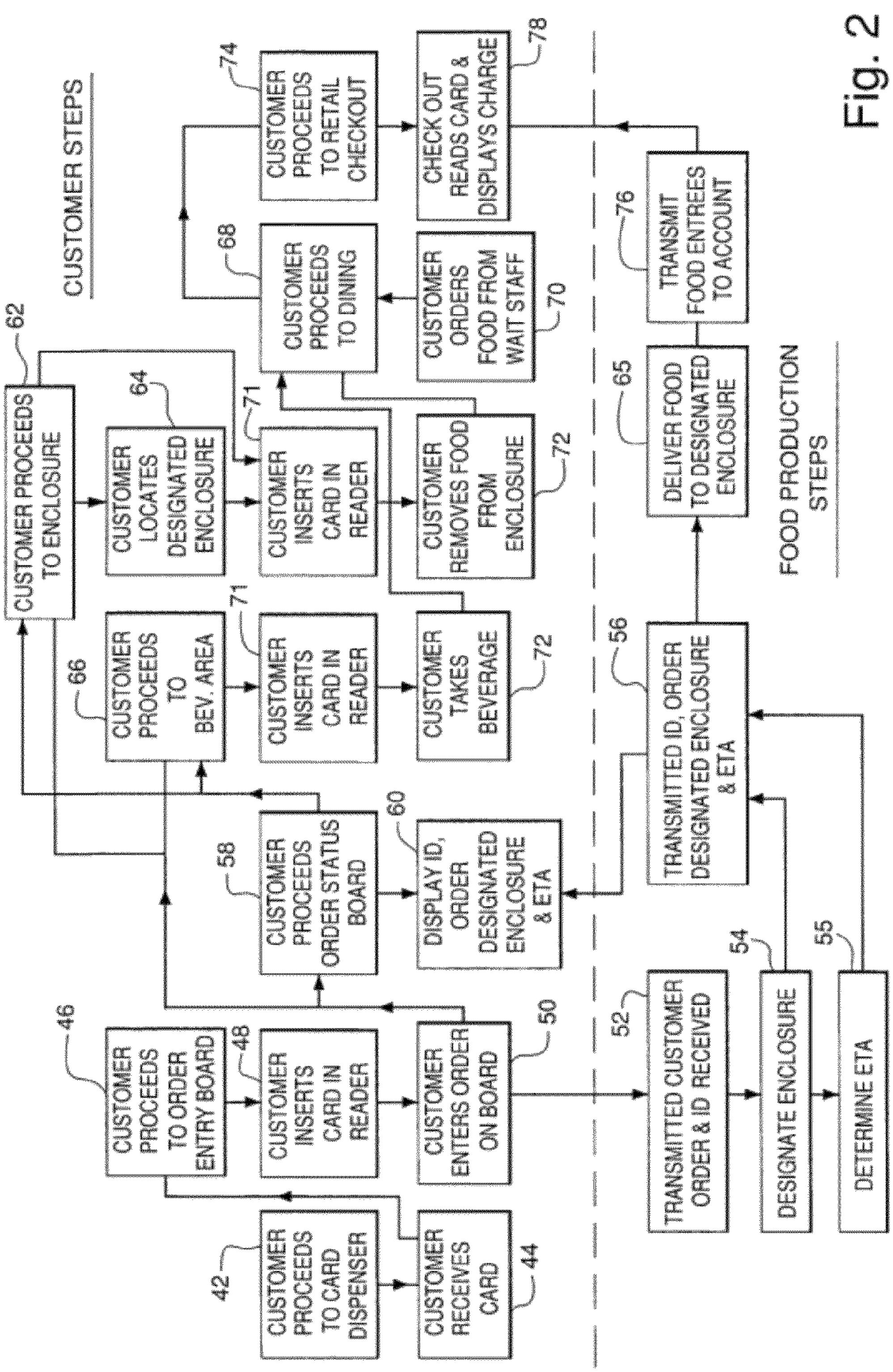
FIG. 2 is a flow chart of customer actions, kitchen actions and customer/kitchen interactions in the restaurant.

The invention will now be described with reference to the flow chart of FIG. 2 so as to show the interaction between the customer food acquisition area 14 and the food supply area 12 as the customer moves through the restaurant 10. After the customer enters the restaurant 10, the customer proceeds to the card dispenser (step 42) regardless of whether the card to be utilized is a credit card or a debit card. Of course, in the case of a debit card, the card will actually purchased at the dispenser 31. The customer then receives a card from the dispenser 31 (step 44).

The customer then proceeds to the order entry board 32 at the order station (step 46) and inserts his or her credit or debit card into a swipe slot (step 48) of a card reader so as to permit the customer to enter an order on a touch screen or other order entry device (step 50). A signal identifying the customer by card account and the food items ordered is then transmitted to the kitchen (step 52) where specific enclosures 18 for receiving each of the food items ordered by the customer are designated (step 54) and estimated times of arrival for those food items at the designated enclosures are determined (step 55).

A signal representing the designated enclosures 18 and the estimated time of arrival of the foods items along with customer identifying information is then transmitted to the status board 32 (step 56). Simultaneously, the customer proceeds to the status board 32 (step 58) and locates his or her displayed identification on the board 32 as well as the estimated time of arrival of the food items ordered at the designated enclosures 18 (step 60).

The customer is now free to go directly to the enclosures 18 (step 62) to access food which is continuously restocked by the kitchen in dedicated but undesignated enclosures or locate and go to designated enclosures 18 (step 64) where food is delivered in response to the customer's order (step 65). The customer is also free to proceed to the beverage area (step 66)

or go directly to the dining area 16 (step 68) and return later to the designated enclosures for items ordered (step 70). Where a wait staff is provided to take subsequent orders on a wireless device, the customer may return to a designated enclosure to access such a subsequent order or ask the wait staff to deliver such an order. In both the beverage area and the food enclosure area, the customer inserts his or her credit card (step 71) and accesses the food or beverage (step 72).

After the customer has completed his or her dining experience, the customer proceeds to the retail and check out area (step 74). Before the customer reaches the checkout area, it is possible to provide access to a retail section selling food and/or other items which may be paid for at check out. Signals corresponding to the value of food ordered by the customer are transmitted from the kitchen (step 76) to the check out area so as to permit the customer to pay for the food ordered displayed at check out as well as well as any retail items selected (step 78).

It will be appreciated that where the card is a debit card, there is no need to transmit signals from the kitchen to the check out area since the debit card has been purchased in advance and the card itself carries the information concerning the status of the customer's account. The check out area merely provides the customer with yet another opportunity to use the value of the debit card purchased upon entering the restaurant.

Where a restaurant credit card is used, the card dispenser 31 shown in FIG. 1 comprises apparatus for encoding account identification information of the type well known in the art. This may be done by encoding a magnetic strip or using an optical encoding scheme such as a bar code where the encoding corresponds to human readable information such as a number which appears on the card so as to permit the customer to identify his or her order on the status board. Where a restaurant debit card is used, the dispenser 31 must also be capable of encoding a value on the card which may be modified as the value of the card is decremented while in use at the restaurant.

With reference to FIG. 3, the order entry station includes a card reader 80 of a type well known in the art which may, for example, comprise a device for magnetically reading a magnetic strip or optically reading an optical bar code when the card is inserted in a swipe slot at the order entry station. Insertion of the card in the slot permits the food ordered on a touch screen to be charged to the customer's account by transmitting a corresponding signal to a restaurant CPU 82 which stores each order and the value of the order under the customer's identification so as to permit retrieval of the information by the check out station 17*b*. Of course, where a debit card is used, such information need not be maintained at the CPU 82 since the value of the debit card will be debited each time it is used in the restaurant.

The CPU 82 also generates a signal designating an enclosure or enclosures to receive a customer's order(s) as well as the estimated time of arrival of the order(s) at the enclosure(s) 18 which is transmitted to an LCD display 84 at the order status board. This signal in combination with an enabling signal from the card reader 85 which is also supplied to a closure enabling mechanism 86 permits the customer to gain access to the food within the enclosure by enabling the customer to open the door 22 of the enclosure 18. The enabling mechanism 86 may control an electromagnetically actuated latch. The designated enclosure(s) and the estimated time of arrival of the order(s) may be generated automatically by the CPU 82 or manually by use of a touch screen 87 in the kitchen or food supply area 12 in response to the information appearing on the order display screen 88 after manually estimating the time for delivery and designating the enclosure(s) from an inventory of undesignated enclosures. The CPU 82 may also receive signals from card reader 85 at a bank of dedicated enclosures for food items that are continually restocked by the food supply area so as to provide ready access to customers without ordering at the order board 32. Such signals advise the CPU of the charge to a customer's account as well as advising the food supply area of the need to restock and/or create an inventory of such items so as to assure that the customers always have ready access to such food items.

It is also desirable to provide a wait staff in the dining area with a portable wireless order entry terminals 89 which includes a card swipe slot so as to appropriately charge or debit the customer's account for the food item(s) ordered from the dining area. As noted above, these food items can be delivered to the table of the customer by the wait staff or to an enclosure 18 designated by the CPU 82 which may also appear on the LCD display of the status board. A card reader 90 and the CPU 82 provide a signal to the account display 92 so as to advise the customer of the amount due on the customer's account.

Although the customer authorization device described has been referred to as a restaurant credit or debit card, it will be appreciated that the device may take other forms including but not limited to wand of the type used at gasoline pumps. It is only necessary that the device identify the customer's account when received at the ordering station, the food enclosures, the wireless wait staff devices and the check out area, and in the case of a debit device, be capable of being encoded with a value that may be debited as the device is used in the restaurant.

It will be appreciated that various aspects of the invention may be accomplished in a completely automated way, a partially automated way or manually. For example, production, supply and delivery of the food may be accomplished robotically or with a robotic and manual combination or entirely manually.

Various aspects of the invention have been described in terms of a restaurant. In using the word restaurant, it is not intended to limit the invention to a stand alone restaurant. Rather, any facility which includes dining for patrons could embody the invention including, but without limitation, casinos, theme parks, hotels and transportation terminals.

While the invention is susceptible to various modifications and alternative constructions, certain illustrated embodiments have been shown in the drawings and accompanying detailed description. It should be understood, however that there is no intention to limit the invention to the specific construction disclosed herein. On the contrary, the invention is intended to cover all modifications, alternative constructions, and equivalents falling within the scope and spirit of the invention.

What is claimed:

1. A method of delivering food at a restaurant comprising a plurality of food delivery enclosures having customer access openings covered by lockable closures through which food is accessible by customers and a food supply area from which food is delivered to the enclosures, the method comprising:

providing at least one customer ordering terminal for entering a food order;

providing a computer system in electronic communication with the at least one ordering terminal;

electronically transmitting the food order entered by a customer to the computer system;

electronically receiving the food order from the computer system in the food supply area;

electronically storing the food order entered by the customer and a corresponding one of the enclosures in the computer system;

delivering food for the food order to the corresponding one of the enclosures;

electronically displaying to the customer the identity of the stored corresponding one of the enclosures; and electronically transmitting a signal from the computer to the corresponding one of the enclosures enabling the customer to open the lockable closure on the corresponding one of the enclosures.

2. The method of claim 1 further displaying an amount of time estimated before the food ordered by a customer is to be delivered to the corresponding one of the food enclosures.

3. The method of claim 1 further displaying a pictorial representation of the food to be delivered to the corresponding one of the enclosures.

4. The method of claim 3 further comprising the step of providing a screen on each of the closures of each of the enclosures for displaying the pictorial representation.

5. The method of claim 4 wherein the pictorial representation is displayed at a location different from the stored identity of one of the enclosures.

6. The method of claim 1 wherein the computer stores information associated with a customer authorization device used for billing purposes and to electronically enable the customer to open the lockable closure on the corresponding one of the enclosures when the customer authorization device is in communication with the enclosure.

7. The method of claim 6 wherein the customer authorization device comprises a credit card.

8. The method of claim 1 including the step of electronically selecting the corresponding one of the enclosures.

9. The method of claim 1 wherein the customer ordering terminal is provided at a location remote from the lockable enclosures.

10. A method for supporting the service of food at a restaurant comprising a plurality of enclosures having customer access openings covered by lockable closures accessible by customers, a food supply area for delivery of food for consumption by customers, a computer system, at least one screen in electronic communication with the computer system, a customer order terminal capable of communicating with a customer and a customer's authorization device, and at least one order information facility accessible in the food supply area and in electronic communication with the computer system, the method comprising the steps of:

receiving a food order entered by the customer and customer authorization information corresponding to the customer authorization device;

transmitting an electronic signal to the computer system representing the food order and the authorization information;

transmitting an electronic signal from the computer system to the food supply area representing the food order;

electronically storing the food order, the authorization information and a corresponding one of the enclosures for receiving the food order in the computer system;

electronically displaying information on the screen and viewable by the customer identifying the corresponding one of the enclosures receiving the food order;

delivering food corresponding to the food order to the corresponding food delivery location in response to an order at the information facility; and electronically transmitting a signal from the computer to the corresponding one of the enclosures so as to enable the customer to open the one of the lockable closures for the corresponding one of the closures when the authorization device of the customer is in communication therewith.

11. The method of claim 10 wherein each of the closures comprises a closure screen and further comprising storing visual content in the computer system for display on the closure screen at the corresponding one of the enclosures.

12. The method of claim 10 wherein the visual content includes entertainment.

13. The method of claim 10 wherein the restaurant comprises at least one touch screen accessible by the customer and the method includes the step of receiving a food order entered by the customer on the touch screen.

14. The method of claim 10 wherein the authorization device comprises a credit device.

15. The method of claim 10 wherein the authorization devices comprises a debit device.

16. The method of claim 10 including the step of electronically selecting the corresponding one of the enclosures.

17. The method of claim 10 wherein the food order is received at one customer service location in the restaurant and the food is delivered to the corresponding one of the enclosures in another customer service location in the restaurant.

* * * * *